Jan. 2, 1951   V. M. CREMASCHI   2,536,994
CONTINUOUS FERMENTATION OF WINE AND THE LIKE
Filed Aug. 23, 1948   2 Sheets-Sheet 1

INVENTOR
Victor Manuel Cremaschi
BY Pennie, Edmonds, Morton and Barrows
ATTORNEYS Patented Jan. 2, 1951

2,536,994

UNITED STATES PATENT OFFICE 2,536,994

CONTINUOUS FERMENTATION OF WINE AND THE LIKE

Victor Manuel Cremaschi, Buenos Aires, Argentina

Application August 23, 1948, Serial No. 45,742

15 Claims. (Cl. 99—35)

The present invention refers to improvements in the process and apparatus covered in my co-pending application No. 750,255 filed on May 24, 1947, now Patent No. 2,536,993 of January 2, 1951, of which the present application is a continuation-in-part, and to products obtained by the improved process and apparatus. The said co-pending application refers principally to a process for the continuous fermentation of crushed grapes comprising essentially the steps of continuously or intermittently introducing in the lower portion of a tank or vat crushed grape at such a rate as to completely fill the tank or vat by the time the first introduced batch of crushed grape has completed its fermentation and thereafter withdrawing amounts proportional to the fresh crushed grape, skins from the upper portion of the tank or vat, wine from a zone immediately beneath and seed from the lower portion thereof. This process differs from known methods in that at any moment, grape in all degrees of fermentation is present in the vat or tank.

The present invention is based on the discovery that the process according to application No. 750,255 permits the recovery of valuable by-products which cannot be recovered on a commercial scale utilizing the processes of the prior art.

One of the principal objects of the present invention is therefore to modify the process covered in my aforementioned application so as to permit the recovery of at least a substantial part of the vapours and gases formed during fermentation. In processes prior to said application these vapours and gases were allowed to freely escape because when treating one given batch of grape in a relatively small vessel, as for example, the conventional vat, the recovery of these gaseous by-products could not be effected economically. However, when the fermentation is carried out continuously there exists the possibility of retrieving these gases and vapours which, as I have discovered, constitute by-products of appreciable industrial and commercial value, consisting principally of a mixture of carbon dioxide and several evaporated components of the grape undergoing fermentation. After the carbon dioxide has been separated there remains a mixture of said components, which, due to comprising alcohols, essential oils and volatile acids, aldehydes, etc., form a commercial product which may be advantageously added to the wine in order to considerably improve the quality thereof. A further object of the present invention thus consists in not only recovering, but recycling said mixture through the fermenting tank or vat to produce a wine of better quality.

Another object of the invention resides in providing an apparatus for carrying out the process of co-pending application No. 750,255 modified in accordance with the present invention.

Yet another object of the invention is the recovery of carbon dioxide formed during fermentation.

All these objects and others which will be clear from the following detailed description of the invention may be realized by introducing in the process of the aforementioned application, comprising essentially the steps of, continuously or intermittently introducing into the lower portion of a closed tank or vat crushed grape at such a rate so as to fill said tank or vat up to its capacity by the time the first introduced grape has completed its fermentation and withdrawing in amounts proportional to those continuously or intermittently fed, skin from the upper portion, wine from a zone immediately beneath and seed from the bottom of the tank or vat, the improvement consisting in separately withdrawing from the upper portion of the tank or vat the carbon dioxide and other gases and vapours formed during fermentation and condensating these other gases and vapours in order to recover and, if desired, recycle at least a part of the condensate.

According to another feature, the invention comprises an apparatus for carrying out the improved process, including a closed tank, having in the lower portion thereof, an inlet for crushed grape and a seed outlet, and in the upper portion, a wine outlet and a mechanism for removing skins, the apparatus being characterized by an opening provided in the upper portion thereof for withdrawing vapours and gases formed, and conduits adapted to connect this opening to a condenser through a compressor.

Further features of the process, apparatus and product will become evident from the following detailed description of the invention, in which reference will be made to the accompanying drawings which illustrate by way of example, and schematically, a preferred embodiment of the apparatus according to the invention.

In these drawings.

Figure 1:
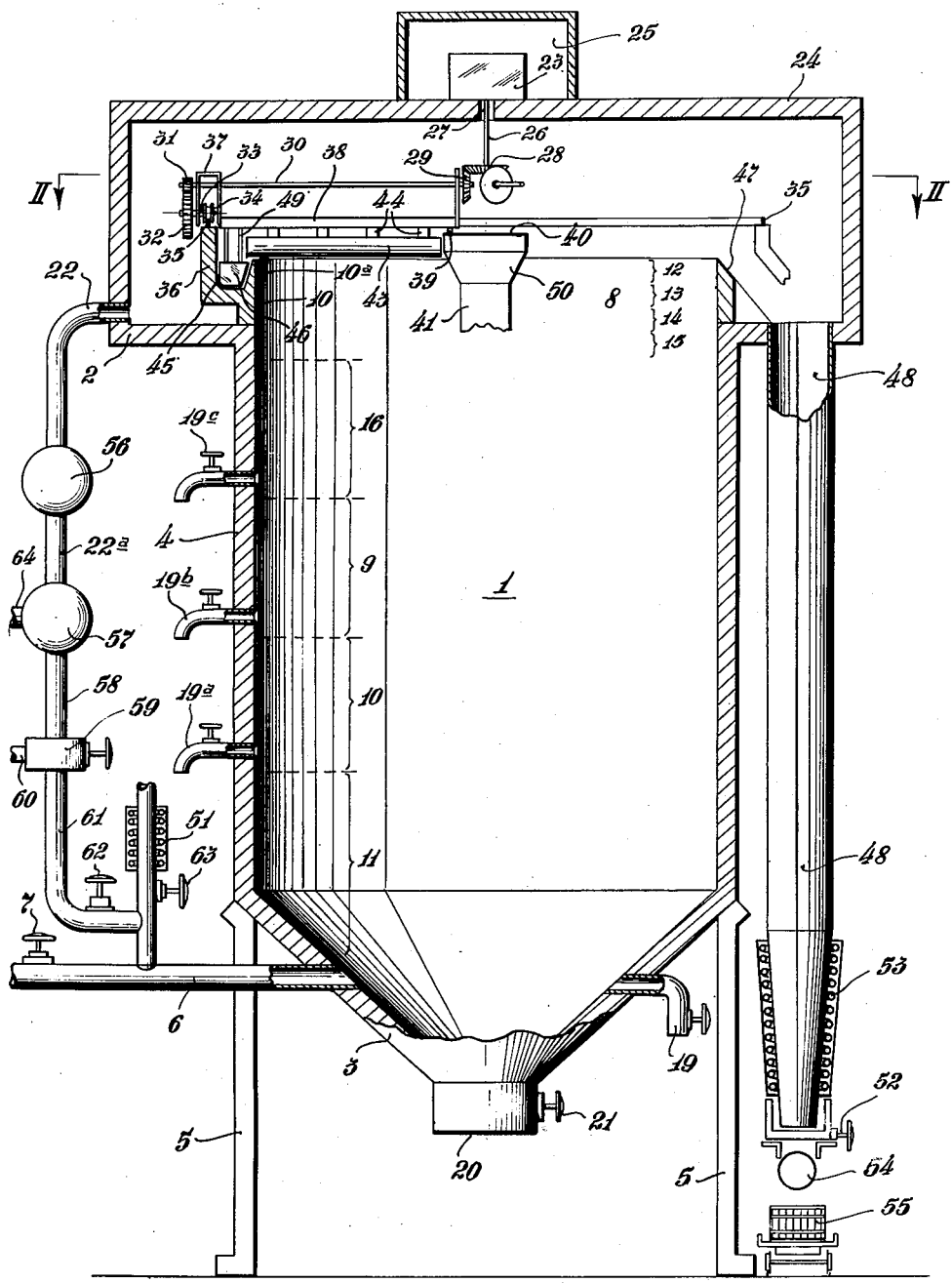
Figure 1 is an elevational view partly in section through the apparatus.

As already explained, the process according to the present invention is a continuous method carried out within a closed container which, according to the embodiment shown in the drawings, comprises a tank 1, mounted on a supporting frame 5. The tank consists of a frusto-conical lower portion 3, a cylindrical body 4, and a head portion 2, of greater diameter than the cylindrical body 4. The crushed grape is fed into the lower portion 3, through a supply pipe 6, provided with a control valve 7, which permits the continuous or intermittent charging of the tank. At the bottom of lower portion 3, there is provided a seed outlet 20, having a control valve 21, adapted to operate in the conventional manner.

The head portion 2, of tank 1, houses a mechanism for withdrawing or removing the skin and which is driven by a motor, for example, an electrical motor 23, suitably arranged upon roof 24, of the tank and within a casing 25, easily accessible from outside. Motor 23 rotates a shaft 26 at high speed, which shaft passes through roof 24, by means of packing gland 27. This packing gland 27, serving to prevent any escape of gases or vapours from the interior of the tank.

Vertical shaft 26 is provided at its lower end with a bevelled gear-wheel 28, secured to shaft 26 so as to rotate therewith, gear-wheel 28 meshes with three bevelled gear-wheels 29 fixed to their respective horizontal shafts 30, each of which is supported from a carriage 37 and provided at its opposite end with a pinion 31, meshing with a gear wheel 32, secured to the axle 33. To axle 33 is fixed a wheel 34, adapted to run on rail 35, mounted on a circular wall 36, formed externally of extension 10, of cylindrical wall 4. It will be clear that by means of the above mentioned transmission assembly, wheel 34, is caused to travel on rail 35, describing a relatively slow circular movement in the direction indicated by arrow A of Figure 2.

Wheel 34 supports carriage 37, from which depends, at its innermost side, an arm 38, resting with its opposite end on a roller or ball 39, running in a circular race 40, arranged on a central support 41, which will be further described later. As will be seen from Figure 2, there are three arms 38, radially extending at angles of 120 degrees and these arms are connected together by means of ring 42, so as to form a rigid unit. Therefore, when carriages 37, driven by motor 23, travel along rail 35, all arms 38, are caused to describe a rotary movement. The speed of rotation is preferably between 4 to 6 R. P. M.

Below each arm 38, and rigidly secured thereto by means of supporting brackets 44, are blades 43, arranged obliquely with respect to radial arms 38, in such a manner that the inner end of each blade, which will hereafter be designated the leading end, is advanced in the direction of rotation indicated by arrow A.

Figure 2:
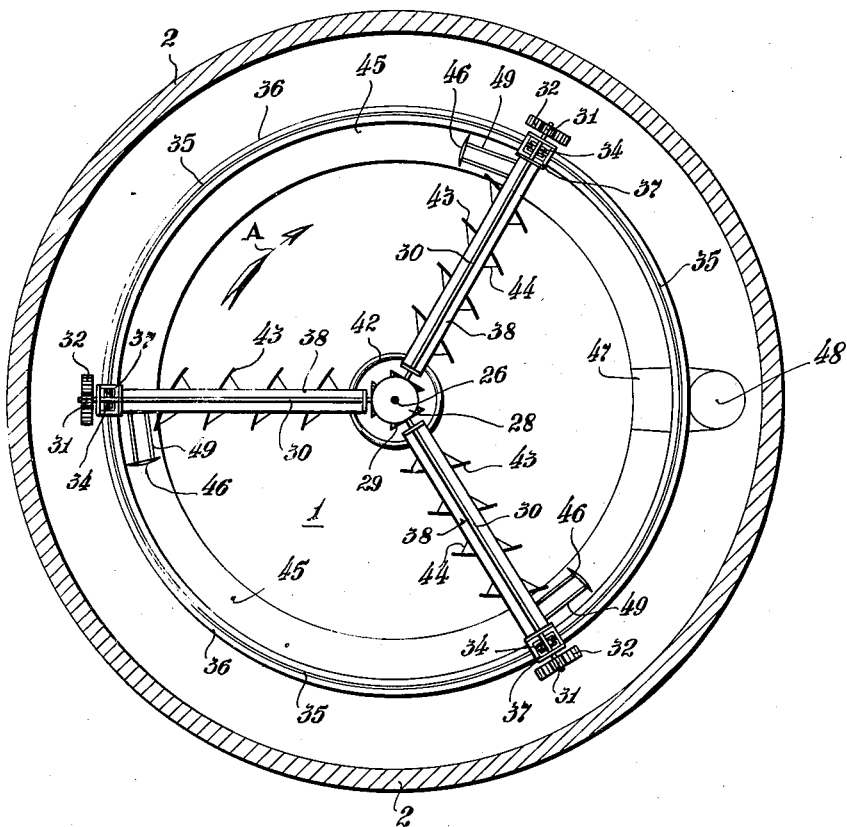
Figure 2 is a cross section along the line II—II of Figure 1.

The rotation of the whole assembly thereby produces a skimming effect pushing the skin towards the periphery of cylindrical body 4, so that they are caused to pass over the tapered upper edge 10a, of cylindrical extension 10, into a circular channel 45, formed between wall 10, and the above mentioned wall 36. In order to furnish a more pronounced pushing effect the leading edge of each blade 38, may be formed convexly as indicated in Figure 2.

Beneath that portion of arms 38, overlying channel 45, and rigidly secured thereto by means of connecting members 49, there is a blade 46, which during the rotary movement of the unit advances the skin accumulated in channel 45, until they fall into mouth 47, of a skin discharge pipe 48. Referring to Figure 2, it will be seen that blade 46 is rearwardly offset from the vertical plane of arm 38. It is desirable to arrange a blade 46, behind the outer end of blade 43, adjacent wall 10a, in order that each blade 43 may collect and sweep all the skin deposited within channel 45, by blades 43, of its respective associated arm 38. The leading edge of blade 46 is preferably of concave shape.

The central support 41, is in turn suitably supported from transversal or diagonal girders (not shown) which will be located in such a manner as not to interfere with the operation of the rotary assembly described. Support 41, is provided with an inclined surface 50, which serves to constrain the skins ascending from bottom of the central portion of the tank to move towards the periphery of cylindrical portion 10.

At the left hand side of Figure 1, a conduit 22 is shown, which serves to withdraw vapours and gases formed or vaporised within the tank during fermentation. For a purpose which will be explained later, conduits 19 are provided in frusto-conical portion 3, and conduits 19a, 19b and 19c in the cylindrical portion 4, all of these conduits having suitable control valves so that liquid may be withdrawn or introduced as desired.

In accordance with the process covered in copending application No. 750,255 crushed grape is supplied through pipe 6, to lower portion 3 of the tank at such a rate that the tank is filled up to its capacity by the time the originally fed batch has concluded its fermentation. Wine produced by said first batch will then occupy zone 16, while the skin from this batch will occupy zone 12. The skin and wine from batches fed to the lower portion of the tank, after the first batch are represented respectively, by zones 13 to 15 and 9 to 11. In other words, if the duration of the fermentation is assumed to be four days, the skin and wine from the crushed grape, continuously or intermittently supplied during the first day, will be located in zones 12 and 16, those of the second day, in zones 13 and 9, those of the third day in zones 14 and 10 are those of the fourth day in zones 15 and 11, respectively.

The next phase of the process consists in withdrawing the wine formed through conduit 19c and seed through outlet 20, and removing skin indicated at 8, by means of the skimming mechanism described, whilst new batches of crushed grape are fed to the lower portion 3, through pipe 6 at such a rate as to replace the withdrawn products thus maintaining the column of materials undergoing treatment at the constant level. It will be understood that the skin is automatically removed when, due to the supply of fresh feed material in the lower portion, it rises to the level of blades 43.

During the whole process of fermentation, gases and vapours are formed which rise to the surface of the column of material within the tank. More particularly, a considerable amount of carbon dioxide is produced which continuously ascends from the lower regions, especially zone 11, to zone 16, and after having passed through the latter filters through the layers of skin until it reaches the enlarged head portion 2. These continuously rising vapours and gases are one factor tending to keep the skin floating in spite of the fact that the specific gravity of the column of liquid decreases due to the conversion of must into wine.

In order to alter the course of fermentation for instance, to accelerate or delay the same, the temperature within the tank may be increased or reduced respectively. The apparatus shown in the drawings provides a simple but efficient means whereby this may be achieved. For the purpose of accelerating the fermentation, wine may be removed through conduits 19c or 19b, from warmer upper zones 16 or 9, respectively, and thereafter reintroduced into the cooler lower regions 11 and 10, through ducts 19 or 19a. If desired, this wine withdrawn through conduits 19c or 19b, may also be admixed with the feed material passed through pipe 6. In this case, the wine not only serves as a heat exchanger in order to increase the temperature of the feed material and thus accelerate fermentation, but the alcohol content thereof at the same time impedes the development of undesirable ferments and micro-organisms offering less resistance to alcohol; thereby the use of sulphurous anhydride and other antifermenting agents can be avoided, the inclusion of which might tend to adversely affect the quality of the wine. If it is desired to use the wine withdrawn from the upper portion of the tank for the sole purpose of replacing the anti-fermenting agents, without increasing the temperature; the same may be cooled before it is added to the crushed grape within pipe 6. The drawings show a heat exchanger 51, serving for this purpose. Alternatively, it may be desirable to heat the wine removed from the upper region of the tank before it is re-introduced into the tank. In this case a heating medium will be supplied to the outer coil of heat exchanger 51.

Effects contrary to those described can be achieved by withdrawing must through ducts 19 or 19a, and re-introducing the same through ducts 19b or 19c into the upper portion of the tank, from where it descends, thus decreasing the temperature and consequently delaying the fermentation.

In accordance with the preceding description one of the principal purposes of the invention is the recovery of at least a substantial part of vapours and gases formed during the fermentation and in order that this may be realized it will be necessary to prevent these vapours and gases from escaping through the outlet for the skins located in the widened or enlarged head portion 2. The embodiment shown in the drawings comprises for this purpose, a pipe 48, hermetically connected to the lower surface of the shoulder formed by head portion 2. Pipe 48, extends downwardly and is provided at its lower end with a guillotine closure 52. Immediately above the same is a heating coil 53, connected to a source of heat (not illustrated). That part of pipe 48, surrounded by coil 52, preferably converges in a downward direction so that its outlet end presents the same shape and size as the inlet end of a conventional screw press 54, in which the skins are pressed and then conducted to a hydraulic press 55. The pressing is effected in the conventional manner but the arrangement described is such that it allows the weight of the skins accumulated within pipe 48, to contribute in applying pressure.

It will be understood that pipe 48, provides a seal for preventing the escape of gases or vapours when the skins are discharged. The skin in the lower part of said pipe is heated by means of coil 53, so that alcohol, gaseous and other vaporizable components are expelled therefrom and thus returned to the widened head portion of tank 1. Apart from this, the heating increases the solubility of the colouring matter contained in the skins and this will render the further separation thereof easier. This separation, which does not form part of the present invention may be carried out in the conventional manner. The temperature of the skin in the lower portion of the pipe 48, will be adjusted preferably at a range of 70 to 80 degrees centigrade or more.

The gases and vapours formed, and which are continuously removed from the tank by conduit 22, are led to a compressor schematically represented at 56, and thereafter through tube 22a to a condenser indicated at 57. In this condenser the carbon dioxide is separated and the condensate is passed through a tube 58 to a valve 59, through which it may be withdrawn from the system through tube 60. Alternatively if desired, the condensate or part thereof may be recycled through conduit 61, valve 62 and pipe 6, to the lower portion 3 of tank 1. By means of valve 63, the amount of wine desired to be recycled may be controlled and the same may be added to the condensate to be recycled. Carbon dioxide is removed from the system through conduit 64, and may be used for industrial purposes, for instance, as refrigerant.

It will be seen that the instant invention provides a simple method of recovering a valuable by-product containing principally alcohols, essential oils and other components of the wine, which constitute important factors determining the aroma, flavour and taste of the wine. These components in the processes of the prior art, were allowed to escape but I have found that their incorporation in the finished wine or their recycling with the feed material, substantially improves the above mentioned properties.

The instant invention is not limited to the specific embodiment described and shown; more particularly while the apparatus for removing skins has proved to be satisfactory it could be modified or replaced by mechanism operating on a different principle. However, since the same operates within a closed container, such alternative mechanism should be simple in construction so as to exclude as far as possible the risk of mechanical failure. Furthermore, agitation or stirring must be avoided, and to this end it may be advisable to arrange the girders supporting the central support 41, in regions 13 or 14 with the object of providing surfaces tending to oppose and restrict the setting up of a circular movement of the material undergoing treatment.

While a larger or smaller number of arms 38, may be employed it has been found that in utilizing three arms the whole unit is balanced and no difficulty is encountered in providing the bevelled gear assembly described.

Although tube 48 provides an effective seal, mechanical valve means may be used in order to enable the skin to be withdrawn without substantial loss of vapours or gas. It will be evident that lubricating devices, ball bearings, etc., should be provided in a suitable manner wherever required.

Having described the nature and purpose of the invention and a particular manner in which it may be performed, what I claim is:

1. A continuous process for the fermentation of crushed grapes to produce wine which comprises, maintaining in a closed upright fermentation vat under fermenting conditions a column of liquid including must in progressive stages of fermentation from bottom to top of the column of liquid, feeding crushed grapes into said vat at the bottom portion thereof and subjecting them to fermenting conditions within the vat so as to produce carbon dioxide in at least an amount sufficient to keep the grape skins and pulp floating on top of said column of liquid, withdrawing grape skins and pulp from the top portion of the column in said vat, wine from the uppermost portion of the column of liquid and seed from the bottom portion of the vat, withdrawing carbon dioxide and other gases and vapors formed during the fermentation from the upper portion of the vat, condensing and recovering at least a portion of said other gases and vapors as products of the process, and separately recovering the carbon dioxide.

2. A continuous process as claimed in claim 1 in which the carbon dioxide and other gases and vapors withdrawn from the upper portion of the vat are compressed and subjected to condensing conditions, and regulating the temperature of fermentation in the vat to control the course of the fermentation by withdrawing liquid from a given zone in the vat and reintroducing the same into another zone in the vat.

3. A continuous process for the fermentation of crushed grapes to produce wine which comprises, maintaining in a closed upright fermentation vat under fermenting conditions a column of liquid including must in progressive stages of fermentation from bottom to top of the column of liquid, feeding crushed grapes into said vat at the bottom portion thereof and subjecting them to fermenting conditions within the vat so as to produce carbon dioxide in at least an amount sufficient to keep the grape skins and pulp floating on top of said column of liquid, withdrawing grape skins and pulp from the top portion of the column in said vat, wine from the uppermost portion of the column of liquid and seed from the bottom portion of the vat, and regulating the fermentation temperature in the vat in order to control the course of the fermentation therein by withdrawing liquid from a given zone of the clumn of liquid and reintroducing the withdrawn liquid into another zone in the column having a different temperature.

4. A continuous process as claimed in claim 3 in which said liquid withdrawn from a given zone is subjected to heat exchange with a heat transfer medium to change its temperature and then reintroduced into the column of liquid in the vat.

5. A continuous process as claimed in claim 3 characterized by withdrawing liquid from an upper zone of the column of liquid in the vat and reintroducing the withdrawn liquid into a lower zone in the vat so as to heat the material undergoing treatment therein and accelerate the fermentation in said lower zone.

6. A continuous process as claimed in claim 3 characterized by withdrawing liquid from an upper zone of the column of liquid in the vat and reintroducing the withdrawn liquid into a lower zone thereof along with the crushed grape feed.

7. An apparatus for the fermentation of crushed grapes, comprising an upright fermentation vat including a gas-tight cover means closing the top of the vat and a conical bottom, a conduit for introducing crushed grapes into the lower portion of the vat, an outlet conduit opening into the upper portion of the vat through which grape skins and pulp are adapted to be discharged, means in the upper portion of the vat for moving grape skins and pulp toward said outlet conduit, means for withdrawing grape seeds from the bottom of the vat, and a vapor recovery means connected into the upper portion of the vat.

8. An apparatus as claimed in claim 7, in which the means for moving grape skins and pulp comprises a skimming mechanism.

9. An apparatus as claimed in claim 8, in which the upper portion of the vat is provided with a peripheral annular trough for receiving the grape skins and pulp skimmed by said mechanism, and means operatively associated with said mechanism for moving grape skins and pulp along said trough into said outlet conduit.

10. An apparatus as claimed in claim 9, in which said mechanism includes a blade for moving skimmed grape skins and pulp into the trough, and means for moving said blade in one direction along the inner periphery of said trough, said means for moving grape skins and pulp along the trough being offset with respect to said blade rearwardly thereof in the direction of its movement.

11. An apparatus as claimed in claim 7, in which said vapor recovery means includes a condenser, and means for conducting condensate from said condenser into the vat.

12. An apparatus as claimed in claim 7, in which said vapor recovery means includes a compressor, and a condenser connected into the discharge of the compressor.

13. An apparatus as claimed in claim 7, including a wine withdrawal conduit opening into the upper portion of the vat below the level of said outlet conduit for grape skins and pulp.

14. An apparatus as claimed in claim 13, including an additional conduit means for introducing liquid into the vat at a point below the outlet conduit for grape skins and pulp, and a heat exchanger associated with said additional conduit means for changing the temperature of the liquid conducted therethrough.

15. A continuous process as claimed in claim 1 in which the withdrawn gases and vapors are products of value produced during the fermentation adapted to improve the wine produced in the process, and recycling at least a portion of said products back into the fermentation vat for improving the wine produced by the process.

VICTOR MANUEL CREMASCHI.

REFERENCES CITED

The following references are of record in the file of this patent:

UNITED STATES PATENTS

| Number | Name | Date |
| --- | --- | --- |
| 878,790 | Freund | Feb. 11, 1908 |
| 1,510,195 | Romer | Sept. 30, 1924 |
| 1,806,698 | Miller | May 26, 1931 |
| 2,371,208 | Alzola | May 13, 1945 |